United States Patent
Barros et al.

(10) Patent No.: US 10,692,289 B2
(45) Date of Patent: Jun. 23, 2020

(54) POSITIONAL RECOGNITION FOR AUGMENTED REALITY ENVIRONMENT

(71) Applicant: GOOGLE LLC, Mountain View, CA (US)

(72) Inventors: Brett Barros, Millbrae, CA (US); Xavier Benavides Palos, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 9 days.

(21) Appl. No.: 15/820,808

(22) Filed: Nov. 22, 2017

(65) Prior Publication Data

US 2019/0156577 A1   May 23, 2019

(51) Int. Cl.

| | |
|---|---|
| *G06T 19/00* | (2011.01) |
| *G06T 19/20* | (2011.01) |
| *G06T 7/73* | (2017.01) |
| *G06K 7/14* | (2006.01) |
| *G06K 9/00* | (2006.01) |
| *G06K 9/18* | (2006.01) |
| *G06K 9/20* | (2006.01) |

(Continued)

(52) U.S. Cl.
CPC ........ *G06T 19/006* (2013.01); *G01C 21/3623* (2013.01); *G01C 21/3644* (2013.01); *G06K 7/1417* (2013.01); *G06K 9/00671* (2013.01); *G06K 9/18* (2013.01); *G06K 9/2063* (2013.01); *G06T 7/73* (2017.01); *G06T 19/20* (2013.01); *G06F 3/011* (2013.01); *G06T 2200/04* (2013.01); *G06T 2207/30204* (2013.01); *G06T 2219/2004* (2013.01)

(58) Field of Classification Search
CPC ..... G06T 19/006; G06T 7/73; G01C 21/3623; G01C 21/3644; G06K 7/1417
See application file for complete search history.

(56) References Cited

U.S. PATENT DOCUMENTS

| 10,012,505 B2* | 7/2018 | Dayal | G01C 21/00 |
|---|---|---|---|
| 2011/0121068 A1* | 5/2011 | Emanuel | G01S 5/16 |
| | | | 235/375 |

(Continued)

OTHER PUBLICATIONS

"About Augmented Reality and ARKit", Apple Developer Documentation (https://developer.apple.com/documentation/arkit/about_augmented_reality_and_arkit), printed Oct. 10, 2017, 3 pages.

(Continued)

*Primary Examiner* — Sarah Lhymn
(74) *Attorney, Agent, or Firm* — Brake Hughes Bellermann LLP

(57) ABSTRACT

A method includes: receiving, in a first device, a relative description file for physical markers that are positioned at locations, the relative description file defining relative positions for each of the physical markers with regard to at least another one of the physical markers; initially localizing a position of the first device among the physical markers by visually capturing any first physical marker of the physical markers using an image sensor of the first device; and recognizing a second physical marker of the physical markers and a location of the second physical marker without a line of sight, the second physical marker recognized using the relative description file.

19 Claims, 8 Drawing Sheets

(51) Int. Cl.
  *G01C 21/36* (2006.01)
  *G06F 3/01* (2006.01)

(56) References Cited

U.S. PATENT DOCUMENTS

| | | |
|---|---|---|
| 2011/0221771 A1 | 9/2011 | Cramer et al. |
| 2012/0108332 A1 | 5/2012 | Baseley et al. |
| 2012/0164938 A1 | 6/2012 | Jeong et al. |
| 2012/0218300 A1* | 8/2012 | Hayakawa ............... A63F 13/06 345/633 |
| 2012/0249528 A1 | 10/2012 | Park et al. |
| 2013/0002717 A1* | 1/2013 | Deffeyes ................ G09G 5/377 345/633 |
| 2013/0155108 A1 | 6/2013 | Williams et al. |
| 2014/0241599 A1* | 8/2014 | Chen .................... A61B 5/0033 382/128 |
| 2015/0302645 A1 | 10/2015 | Takeuchi |
| 2016/0335275 A1 | 11/2016 | Williams et al. |
| 2016/0337599 A1 | 11/2016 | Williams et al. |
| 2017/0186235 A1 | 6/2017 | Chu |
| 2018/0135986 A1* | 5/2018 | Dayal ................... G01C 21/00 |

OTHER PUBLICATIONS

"Tango (platform)", Wikipedia (https://en.wikipedia.org/w/index.php?title=Tango_(platform)&oldid=800757878), printed Oct. 10, 2017, 5 pages.

"Vuforia 6.5, now in Unity", https://library.vuforia.com/, printed Oct. 10, 2017, 4 pages.

Breen, et al., "Interactive Occlusion and Collision of Real and Virtual Objects in Augmented Reality", Technical report ECRC-95-02, European Computer-Industry Research Centre, 1995, 22 pages.

Burke, "ARCore: Augmented reality at Android scale", Google AR and VR (https://www.blog.google/products/google-vr/arcore-augmented-reality-android-scale/), Aug. 29, 2017, 5 pages.

Reitmayr, et al., "Collaborative Augmented Reality for Outdoor Navigation and Information Browsing", Conference Paper, Jan. 2004, 11 pages.

International Search Report and Written Opinion for International Application No. PCT/US2018/061815, dated Feb. 27, 2019, 15 pages.

* cited by examiner

POSITIONAL RECOGNITION FOR AUGMENTED REALITY ENVIRONMENT

TECHNICAL FIELD

This document relates, generally, to positional recognition for an augmented reality environment.

BACKGROUND

In the context of computer-based consumption of media and other content, it is becoming increasingly common to provide the participant with immersive experiences. One field involves the presentation of virtual reality (VR) and/or augmented reality (AR) environments on a device such as a smartphone or a tablet. In an AR environment, a person can watch a screen that presents at least both an aspect of a physical environment (e.g., a video or image of a physical space) and an aspect of VR (e.g., a virtual object superimposed on the video or image).

SUMMARY

In a first aspect, a method includes: receiving, in a first device, a relative description file for physical markers that are positioned at locations, the relative description file defining relative positions for each of the physical markers with regard to at least another one of the physical markers; initially localizing a position of the first device among the physical markers by visually capturing any first physical marker of the physical markers using an image sensor of the first device; and recognizing a second physical marker of the physical markers and a location of the second physical marker without a line of sight, the second physical marker recognized using the relative description file.

Implementations can include any or all of the following features. At least the first physical marker can include a code. At least the first physical marker can include a natural marker. The method can further include presenting an augmented reality environment on a display of the first device, the augmented reality environment including at least an image captured using a camera of the first device and at least a first virtual object applied to the image. The first virtual object can be positioned in the image at a predefined location relative to the first physical marker. The position of the first device can initially be localized by aiming the camera in a first direction toward the first physical marker, and after the position of the first device is initially localized, a user can aim the camera in a second direction, and recognizing the second physical marker can include determining, using the relative description file, that a location of the second physical marker is located in the second direction. The method can further include updating the augmented reality environment with a second virtual object in a predefined position relative to the second physical marker. The user can move the first device to the location of the second physical marker, and at the location of the second physical marker the first physical marker may no longer be visible in the augmented reality environment and the user can aim the camera in a second direction toward the location of the first physical marker without a line of sight, and the method can further include updating the augmented reality environment with the first virtual object at the predefined location relative to the first physical marker. Before the second physical marker is recognized, the second physical marker can be removed from the location of the second physical marker, and the second physical marker and the location of the second physical marker can be recognized using the relative description file. Initially localizing the position of the first device can include centering a coordinate system of the first device based on the location of the first physical marker, wherein recognizing the second physical marker does not comprise re-centering the coordinate system. Centering the coordinate system of the first device can include recalibrating a center of the coordinate system to correct a tracking error. The method can further include providing the relative description file to a second device, wherein the second device is configured to initially localize a position of the second device among the physical markers by visually capturing any one of the physical markers using an image sensor of the second device, and to use the relative description file to recognize locations of all remaining ones of the physical markers without a line of sight. The relative description file can be a first relative description file, and the method can further include receiving a second relative description file from a second device, and at least partially merging the first and second relative description files. The relative description file can define the relative position of the second physical marker with regard to the first physical marker, the relative position comprising a displacement of the second physical marker relative to the first physical marker. The first device can recognize at least some of the physical markers, and the method can further include generating a log on the first device reflecting the at least some of the physical markers that the first device has recognized. The relative description file can define the relative position of each of the physical markers with regard to all other ones of the physical markers.

In a second aspect, a non-transitory storage medium can have stored thereon instructions that when executed are configured to cause a processor to perform operations, the operations comprising: receiving, in a first device, a relative description file for physical markers that are positioned at locations, the relative description file defining relative positions for each of the physical markers with regard to at least another one of the physical markers; initially localizing a position of the first device among the physical markers by visually capturing any first physical marker of the physical markers using an image sensor of the first device; and recognizing a second physical marker of the physical markers and a location of the second physical marker without a line of sight, the second physical marker recognized using the relative description file.

In a third aspect, a system includes: a first device configured to receive, for each of physical markers that are positioned at locations, location points determined using the first device, each of the location points associated with a respective one of the physical markers, the first device further configured to generate a relative description file for the physical markers based on the location points, the relative description file defining relative positions for each of the physical markers with regard to at least another one of the physical markers; and a second device and a third device both configured to receive the relative description file generated by the first device, wherein each of the second and third devices is further configured to initially localize a position of the second or third device, respectively, among the physical markers by visually capturing any one of the physical markers using an image sensor of the second or third device, respectively, and to use the relative description file to recognize locations of all remaining ones of the physical markers without a line of sight.

In a fourth aspect, a method includes: receiving, in a first device and for each of physical markers that are positioned at locations, location points determined using the first device, each of the location points associated with a respective one of the physical markers; generating a relative description file for the physical markers based on the location points, the relative description file including relative positions for each of the physical markers with regard to at least another one of the physical markers; and providing the relative description file to at least a second device and a third device, wherein each of the second and third devices is configured to initially localize a position of the second or third device, respectively, among the physical markers by visually capturing any one of the physical markers using an image sensor of the second or third device, respectively, and to use the relative description file to recognize locations of all remaining ones of the physical markers without a line of sight.

Implementations can include any or all of the following features. At least one of the physical markers can include a code. At least one of the physical markers can include a natural marker.

BRIEF DESCRIPTION OF DRAWINGS

Like reference symbols in the various drawings indicate like elements.

DETAILED DESCRIPTION

Figure 1:
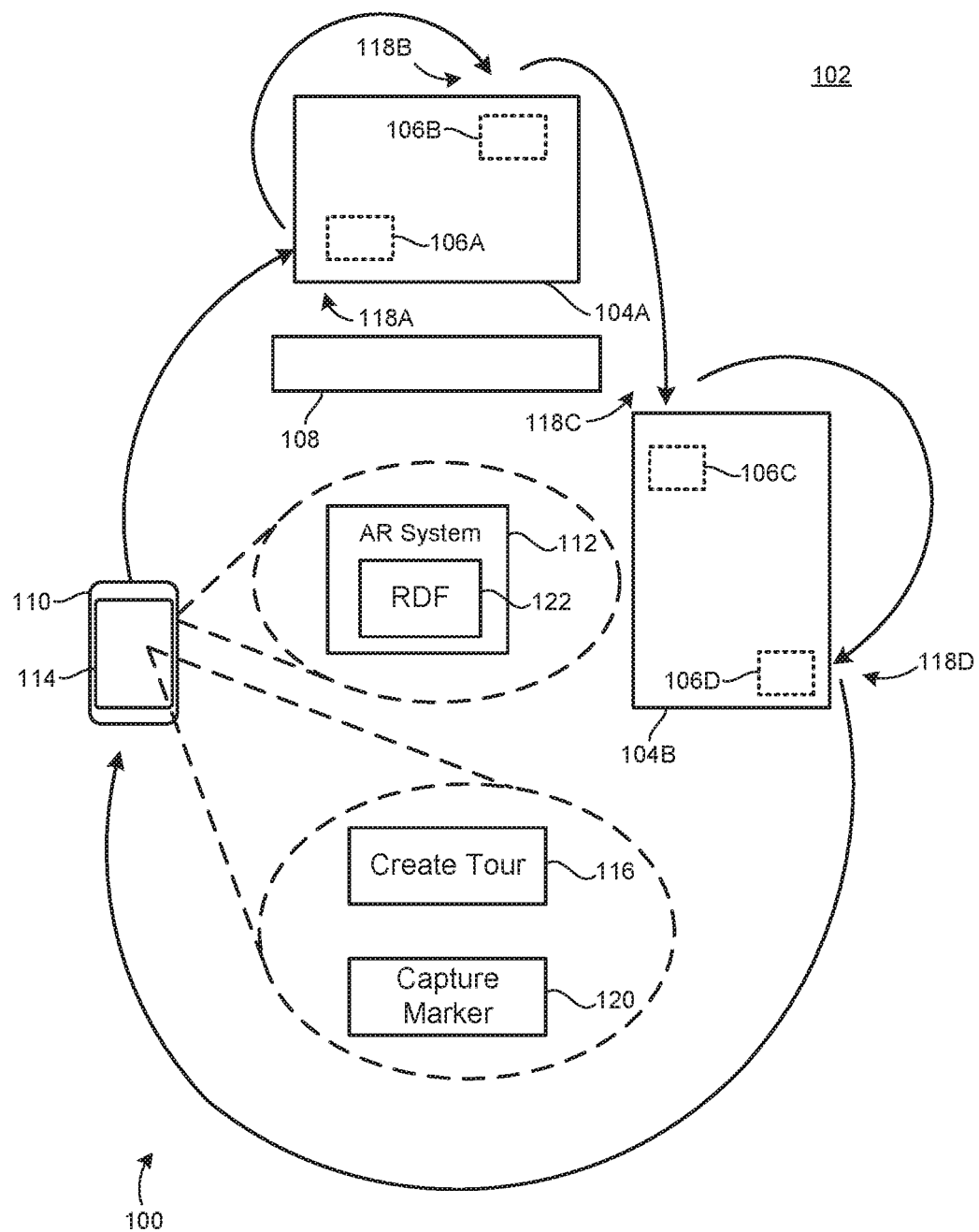
FIG. 1 shows an example of a system that can be used for generating an immersive experience in an augmented reality (AR) environment.

This document describes examples of recognizing markers and their relative positions and orientation in an augmented reality (AR) environment. The AR environment can include imagery of a physical reality (e.g., a camera view of the user's surroundings) and imagery of virtual reality (e.g., an AR object). The presentation of the AR environment can then provide the user a view that simultaneously shows at least some of the imagery of the physical reality and at least some of the imagery of virtual reality. In some implementations, a relative description file (RDF) can define relative positions between a particular set of physical markers that have been placed at respective locations. Such an RDF can be comparatively limited in size and easy to share with multiple devices. A device having the RDF can localize its own position by recognizing one of the physical markers (e.g., using a camera) to extrapolate the device position and orientation, and can use the RDF to learn, and act based on, the locations and identities of the other physical markers, also when these markers are not currently visible or directly detectable by the device. Some implementations can identify both the relative positions and orientations of physical markers, whereas certain examples herein mention only identification of positions for brevity. Some implementations can also or instead be applied in a virtual-reality system, for example to provide an immersive virtual-reality experience.

Existing systems that handle AR environments have attempted to use distinctive and recognizable items (such as a QR code) in the physical environment as anchor points for virtual objects. However, such systems can be dependent on the availability of a line-of-sight to the item. As another example, after a first such marker is recognized, the recognition of a second (or subsequent) marker can trigger a re-centering of the applied coordinate system. When the device no longer sees the marker, it can lose the context of position because such system may not extrapolate the position within the world after it loses sight of the marker. That is, the systems are typically configured to treat the captured marker as the device's "center-of-world" for purposes of presenting an AR environment, such that the AR coordinate system is then centered on the location where the marker was situated. One drawback of this approach is that if more than one marker is used, the device will in a sense re-center its coordinate system whenever it captures the next marker. Another drawback is that when multiple devices are participating, it can become challenging to have a common understanding as to where the center-of-world is.

Some previous systems have attempted to use an area description file (ADF) to facilitate the use of markers in an AR context. Creating the ADF could be a cumbersome process because it may be necessary to walk around a room with a device and have the camera pick up details of all the structures and objects that are present. This approach is based on creating, at a preliminary stage, a comprehensive understanding of the physical location. The resulting ADF can be relatively large, depending on the size of the physical space and the complexity of the structures therein. In a multi-device scenario, where several devices should be using the same ADF in order to facilitate a common AR experience for the users, distributing the large ADF to all devices can take time and can place significant demands on communication networks.

Recently, some AR systems have taken a somewhat different approach to device orientation. For example, some systems are configured to perform environmental tracking using multiple lenses on a handheld device such as a smartphone or tablet. The system can use two lenses and infrared signals to effectively triangulate its position within the room. This can allow the Tango system to have stereo vision and develop a stereoscopic understanding of the room, including its depth, and what surfaces and objects are in the room. The system can conveniently map these features to facilitate its spatial understanding. Other systems offer AR functionality using comparable techniques.

One characteristic of some AR systems is an ability to extrapolate from where the sensing device is in the room. The system can rely on a localization point in the physical world to perform continuous extrapolation of position, to extend its understanding of the structure of the space from that localization point. One benefit of this is that the system is not dependent on having a line-of-sight to a known marker. Rather, by extrapolating from the current position of the device, the system can deduce where the marker is and can perform an AR function based on it, such as to place a virtual object in the location corresponding to the marker.

In some implementations, a system can use a physical marker for at least two beneficial purposes: to indicate a position in space, for example to define a center-of-world for the device, and to use one or more markers as real-world cues to an audience of where they can expect AR objects to appear. For example, an organizer of an educational session such as a lecture or a tour can place markers throughout a room or other physical location. The organizer can capture the individual markers using a handheld device, so as to define for the AR system which marker is located where. When attendees use their own devices to capture the markers, selected virtual objects can become visible in the AR environments that are presented on their respective devices. Also, based on knowing the relative locations of the markers with respect to each other, the AR system can show the attendee a virtual object, corresponding to a marker, before the attendee's device directly detects that marker. Examples are described below.

FIG. 1 shows an example of a system 100 that can be used for generating an immersive experience by way of an AR environment. In some implementations, the immersive experience allows the user to see one or more AR objects in combination with imagery of physical reality. For example, the immersive experience can be organized in form of a tour that includes multiple AR objects positioned at respective locations relative to the physical reality. The system 100 is here shown in a space 102, which can be any kind of physical space, including, but not limited to, a room or other indoor or outdoor premises. The space 102 is here schematically shown from above. Tables 104A-B in the space 102 are visible. For example, an organizer of the tour may be planning that the participants should visit several positions at the tables 104A-B and there be presented with AR experiences as part of the tour. Any other physical structures than tables can be used instead or additionally.

The organizer can place multiple markers in the space 102. Here, markers 106A and 106B have been placed atop the table 104A, and markers 106C and 106D have been placed atop the table 104B. For example, the organizer may have decided that the markers 106A-D should be visited in alphabetical order, from 106A to 106D, or that they can be visited in a random order. The markers 106A-D can be used to trigger the appearance of, and define the location for, one or more virtual objects that will be visible to tour participants, for example as will be described below.

A participant who is positioned at one of the markers 106A-D can have a line-of-sight to one or more other marker. The line-of-sight, when available, can allow the participant and/or the participant's device to view (e.g., directly view along a line) the other marker from their current position. However, in some situations a line-of-sight is not available. For example, a structure such as wall 108 may be positioned between two or more markers. As another example, the participant and the participant's device can be observing the other marker from a particular viewing point (perspective) that the other marker is currently difficult or impossible to perceive from the current position.

The organizer can use one or more devices to create the AR experience. Here, a device 110 is schematically shown in the space 102. Any kind of device can be used, including, but not limited to, a smartphone or a tablet device. The device 110 here includes an AR system 112. The AR system uses light sensing (e.g., infrared light) and two or more lenses to generate a stereo vision in the space 102 in order to develop a stereoscopic understanding thereof that allows the AR system 112 to also extrapolate into positions of the space 102 to which there is currently no line-of-sight. For example, the AR system 112 can be, or can be part of, an AR system that uses a sensing device and is configured to extrapolate from where the sensing device is in the room using a localization point in the physical world. Such AR system can perform continuous extrapolation of position to extend its recognition of the structure of the space from that localization point. In some implementations, the AR system 112 is executed partially on the device 110 and partially on one or more other devices (e.g., another handheld device or a cloud system).

The device 110 can have one or more display screens 114. In some implementations, the display screen can be a touchscreen. For example, the display screen 114 can present a control 116 that allows the organizer to create a tour using the device 110 and (here) the markers 106A-D. Having activated the AR system 112 using the control 116, the organizer can visit the distributed markers 106A in any order. Here, for example, the organizer visits locations 118A through 118D in that order, to capture the respective markers 106A-D. At each location, the device can capture the corresponding marker and make a record of its location. For example, the organizer can trigger the capture using a control 120 that can be presented on the display screen 114. As another example, the device 110 can continuously monitor the signal(s) from its sensor(s) for the presence of markers such as the markers 106A-D and can capture such marker(s) whenever detected. When the device captures any of the markers 106A-D, an identity of the marker and a position of the marker can be registered by the AR system 112. For example, such registration can here reflect that the marker 106A is positioned at the location 118A, that the marker 106B is positioned at the location 118B, that the marker 106C is positioned at the location 118C, and that the marker 106D is positioned at the location 118D. The position of any or all markers can be defined relative to a known position, such as to the position of an anchor marker or other localization point, for example as will be described below.

The initial localization of the device 110 (against any of the markers 106A-D in this example) may not necessarily imply that this particular marker is then defined as the (0,0,0) of the AR world. Rather, the localization marker can be defined by way of an offset relative to an RDF-defined center of the world. Such a center may have been established by an earlier localization (e.g., by the person who arranged/defined the markers in the physical environment), or by a definition (such as by choosing the North Pole).

The AR system 112 can generate one or more data structures based on the capturing of the markers 106A-D done with the device 110. Here, a relative description file (RDF) 122 is generated. The RDF 122 defines relative positions for each of the markers 106A-D with regard to at least another one of the markers 106A-D. In some implementations, the marker 106A can be considered as an anchor marker. The RDF 122 can define the relative position of the marker 106B based on the detected position of the marker 106A; the relative position of the marker 106C can be defined based on the detected position of the marker 106B; and the relative position of the marker 106D can be defined based on the detected position of the marker 106C. For example, if the location of the marker 106A is defined to be (0,0,0) using a Cartesian coordinate system for the space 102, then the relative position of the marker 106B can be defined as the displacement (50,100,0) relative to the position of the marker 106A. In some implementations, the RDF 122 defines the relative location of each of the markers 106A-D with regard to all the other ones of the markers 106A-D.

The markers 106A-D are recognizable by the sensor(s) on the device 110 so that they can be captured accordingly. One or more suitable forms of marker can be used. In some implementations, a code can be used. A code can be a digital code. For example, the marker can include a QR code that is detected by a light sensor (e.g., a camera) on the device 110. In some implementations, a non-code marker can be used. For example, a natural marker can be any relatively flat image that has a sufficient number of features, is rich in contrast, and/or has unique shapes. The natural marker can be detected by a light sensor (e.g., a camera) on the device 110. In some implementations, a marker can comprise one or more features occurring in the physical environment. Such a marker can be defined without physically intervening in the physical environment. An object situated in the physical environment can be defined as a marker. For example, a natural marker can be used, including, but not limited to, a unique photograph with high contrast edges, or a geometric design with unique edges. A real-world marker can be used, including, but not limited to, a photo-captured image of, say, the grain on a table, which can be used analogous to a fingerprint. With at least natural markers and real-world markers, the system looks for a set of image-based features. Such marker codes can be more literally translated into bits and bytes, in some implementations. Based on the captured image(s), an associated marker identity can be determined.

As such, the system 100 can be used to perform one or more processes that are relevant to marker definition and/or recognition. For example, the device 110 can receive location points for each of the markers 106A-D corresponding to the locations 118A-D. The location points can be used for generating the RDF 122. The RDF 122 can define relative positions for each of the markers 106A-D with regard to at least another one of the markers 106A-D. Such an RDF 122 can be provided to one or more devices for use in providing an AR experience, for example as will be described below.

In some implementations, multiple AR entities can be represented in separate groupings organized by respective physical markers. For example, users who have different interest can explore such groupings in different order from each other. In some implementations, a teacher using an implementation can split users into groups among tables in a classroom for space management. The teacher can move the groups between the tables to inspect new AR objects or AR environments. For example, each of the groups of users can remain in a respective area of the classroom, and can then take turns teaching the rest of the users about the AR object(s) that their group has explored. The users in other groups, positioned elsewhere in the classroom, can aim their devices toward the presenting group and see the relevant AR object(s).

Figure 2A:
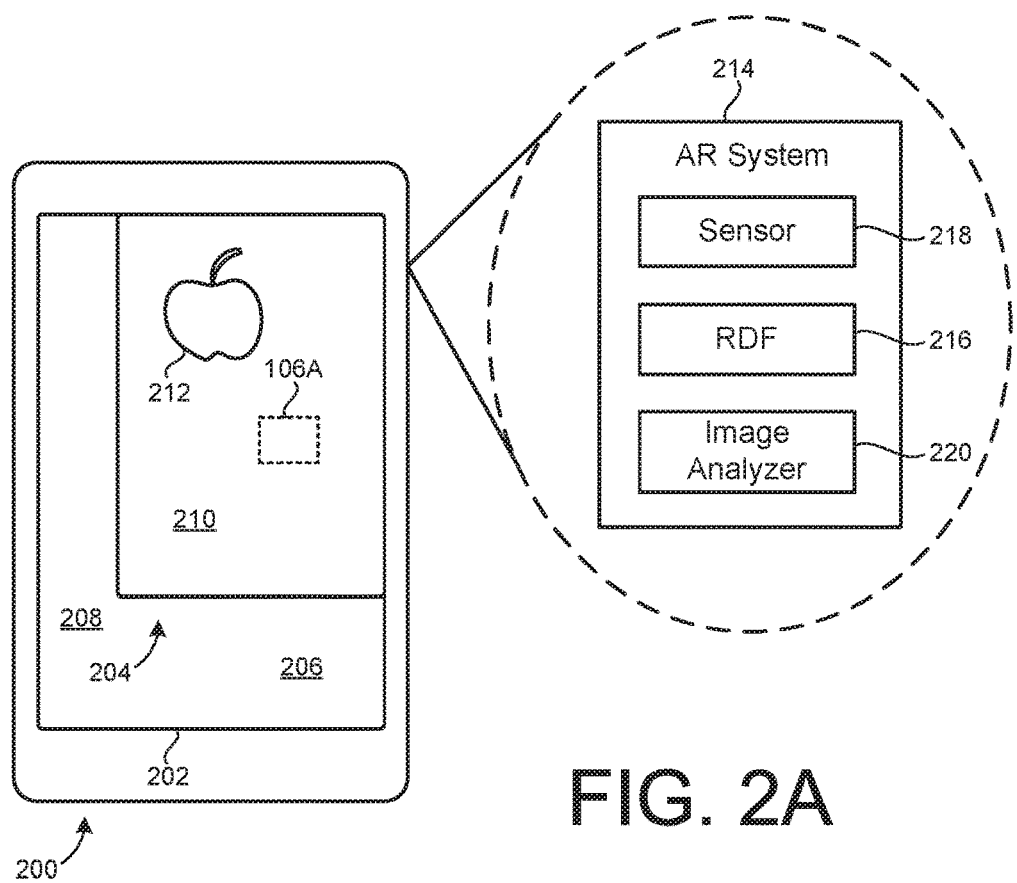
FIGS. 2A-D show examples of devices with AR environments.

FIGS. 2A-D show examples of devices with AR environments. In FIG. 2A, a device 200 is shown, such as a handheld device with at least one display screen 202. The device 200 can be similar or identical to the device 110 (FIG. 1). An AR environment 204 can be presented on the display screen 202. The AR environment 204 can include at least one image 206 captured using a camera of the device 200. For example, a floor 208 and part of a tabletop surface 210 are here visible in the image 206. In some implementations, the tabletop surface 210 can correspond to the table 104A (FIG. 1) on which the markers 106A-B were placed. For example, the AR environment 204 can here reflect that the marker 106A has been captured. The marker 106A is a physical object detectable by a camera and is here visible in the image 206 of the AR environment 204. The image 206 can be a still image, or can be a continuous feed of essentially live video captured by the camera of the device 200. The AR environment 204 can include at least one virtual object 212 applied to the image 206. Here, the virtual object 212 is an apple. For example, the apple is the AR element that has been assigned to the marker 106A. The virtual object 212 is placed at a position in a predefined location relative to the marker 106A. The virtual object 212 has been applied to the tabletop surface 210 in this example, but could instead or additionally be applied to any other part or aspect of the image 206, such as by having the AR element move within the AR environment 204.

The device 200 includes an AR system 214 as schematically indicated. For example, the AR system can be identical or similar to the AR system 112 (FIG. 1). The AR system 214 can receive, maintain and use one or more RDF 216. The RDF 216 can be similar or identical to the RDF 122 (FIG. 1). In some implementations, a device (e.g., the device 110 in FIG. 1) can provide the RDF 216 to one or more devices, such as the device 200. The device 200 can be configured to initially localize its position among multiple markers (e.g., the markers 106A-D in FIG. 1) by visually capturing an arbitrary one of the markers. For example, the device 200 can include an image sensor (e.g., a camera) and can visually capture any or all of the markers using the image sensor. The device 200 can also be configured to use the RDF 216 to recognize all remaining ones of the markers, and their locations, without a line of sight. For example, after the device 200 localizes at one of the markers 106A-D (FIG. 1), the RDF 216 will inform the AR system 214 about the identity and location of all others of the markers 106A-D, also when the device 200 does not have a direct line-of-sight to any such marker(s).

The AR system 214 can use one or more sensors 218 of the device 200 to capture markers. In some implementations, a light sensor can be used. For example, a sensor for infrared light can use two lenses on the device 200 to obtain a stereoscopic view of the physical location.

The signals from the sensor(s) 218 can be interpreted by one or more image analyzers 220. For example, the image analyzer 220 can read a visual symbol that includes a QR code and inform the AR system 214 about the information encoded in the symbol. As another example, the image analyzer 220 can capture an image of a natural marker, and compare at least part of the captured image with a mapping of images to identifiers, to determine the identity of the captured natural marker.

Figure 2B:
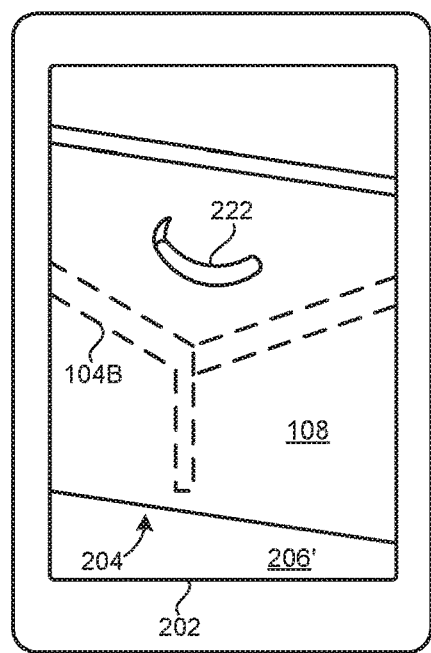

The RDF 216 can allow the user to experience a variety of aspects as part of the tour defined by the distributed markers. For example, after the user localizes the device 200, such as by capturing the marker 106A as indicated in FIG. 2A, the user can aim the sensor 218 (e.g., a camera or other light sensor) in some direction, and the system will indicate whether any markers are positioned along that direction. Assume, for example, and with reference again to FIG. 1, that the user is standing at the location 118A and aims the sensor of the device 200 toward the location 118C where the marker 106C is positioned. The line-of-sight may then be interrupted by the wall 108. That is, the device 200 does not have a line-of-sight from the location 118A toward the location 118C. FIG. 2B shows an example of what the display screen 202 of the device 200 can present in such a situation. In the AR environment 204, an updated image 206' shows that the wall 108 is substantially blocking the line-of-sight in the current direction. The table 104B is obscured by the wall 108 but is indicated in phantom for clarity.

The AR system 214 of the device 200 can access the RDF 216 which defines the relative positions of the available markers. Here, the device is currently positioned at the location 118A and is aimed in the direction of the table 104B. The RDF 216 can then indicate, based on the current location of the device 200 and on the current direction of the sensor, that the marker 106C is positioned in this direction. That is, the AR system 214 can extrapolate beyond the wall 108 and can determine that but for the wall 108 the marker 106C would be within the current line-of-sight. The AR system 214 can therefore recognize the marker 106C in the current situation although the marker 106C is not currently visible to the device. Based on the recognition of the marker 106C, the AR system 214 can place one or more virtual objects 222 in the AR environment 204. For example, the virtual object 222 is here a banana that is added to the image 206' in the virtual environment 204. That is, after the position of the device 200 is initially localized using the marker 106A at the location 118A, the user can aim the camera of the device 200 in an arbitrary direction. Another marker (e.g., the marker 106C) can then be recognized by determining, using the RDF 216, that the relative location of the marker 106C with regard to the marker 106A is located in the current direction.

In some implementations, the AR system 214 can recognize the marker 106C and its position in the situation described above, regardless whether the marker 106C is still in that location. Namely, the recognition can be based on the RDF 216, which defines the location 118C relative to the location 118A, where the device 200 is currently positioned in this example. As such, the AR system can, based on the information in the RDF 216, recognize the location 118C as being the location where the marker 106C was originally captured, and can present the virtual object 222 in the AR environment 204 based on this recognition. That is, the marker 106C can be removed from the location 118C and can thereafter nevertheless be recognized by the AR system 214 based on the RDF 216.

The AR system 214 can log one or more events regarding the device 200. In some implementations, the AR system 214 can generate a log on the device 200 reflecting the markers 106A and 106C that the device 200 has recognized in this example. If the device had also recognized other markers (e.g., one or more of the markers 106B and 106D in FIG. 1) this can be reflected in the log.

Figure 2C:
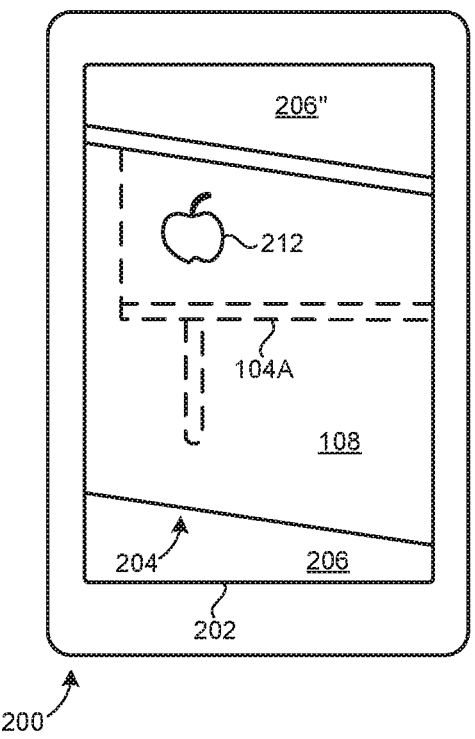

The RDF 216 can facilitate recognition of any marker whose relative position is defined in the RDF 216. Assume, for example, that the user moves to the location 118C (FIG. 1) and aims the camera of the device 200 in the direction toward the location 118A. The RDF 216 can then indicate, based on the current location of the device 200 and on the current direction of the sensor, that the marker 106A is positioned in this direction. FIG. 2C shows that the virtual object 212 has been added to an image 206" of the AR environment 204 presented on the display screen 202. That is, although the table 104A (here schematically indicated) is obscured by the wall 108, the AR system 214 can nevertheless extrapolate beyond this interruption of the line-of-sight, recognize the non-visible marker 106A, and place the virtual object 212 in the correct position. For example, if the device 200 for any reason had lost its localization by the time the device 200 was positioned at the location 118C, the user can relocalize the device 200 against the marker 106C and thereafter aim the camera elsewhere, such as toward the location 118A. Because the device 200 has again been localized in this example, and because the RDF 216 indicates the positions of virtual objects relative to the device 200, the system can place the virtual object 212 so as to be visible to the user from the current location, although the marker 106A (FIG. 2A) itself is not currently detected by the device 200.

The initial localization of the device, such as at the marker 106A in the location 118A, can correspond to a centering of a coordinate system of the device 200 on that location. For example, the AR system 214 can define the coordinate system based on readings from the one or more sensors 218. Moreover, when the AR system 214 then detects another marker, such as the marker 106D if the device 200 is moved to the location 118D, the AR system 214 may not re-center the coordinate system. Rather, the AR system 214 can recognize the marker 106D based on the relative positions defined in the RDF 216, and can place a virtual object in a position based on the recognized marker, without re-centering its coordinate system in doing so. Although the coordinate system is not re-centered, a center of the coordinate system can be re-calibrated. For example, this can be done to correct a tracking error. In some implementations, a subsequent marker (e.g., the marker 106C) can be used to relocalize the device 200 such that any tracking inaccuracies in relocating the device 200 from, say, the marker 106A to the marker 106C are rectified.

In some implementations, the position of the device 200 can initially be localized by centering a coordinate system of the device based on the location of a physical marker. Another physical marker can then be used for re-centering the coordinate system. In so doing, any virtual objects (e.g., the virtual objects 212, 222) can continue to be presented in the same space. In some implementations, this can occur by way of camera passthrough, for example because the relative coordinates are proportionally the same. As such, re-centering the system but keeping virtual objects in the same place is possible. That is, the whole virtual world can shift, but the relative positions of the markers can stay the same.

Figure 2D:
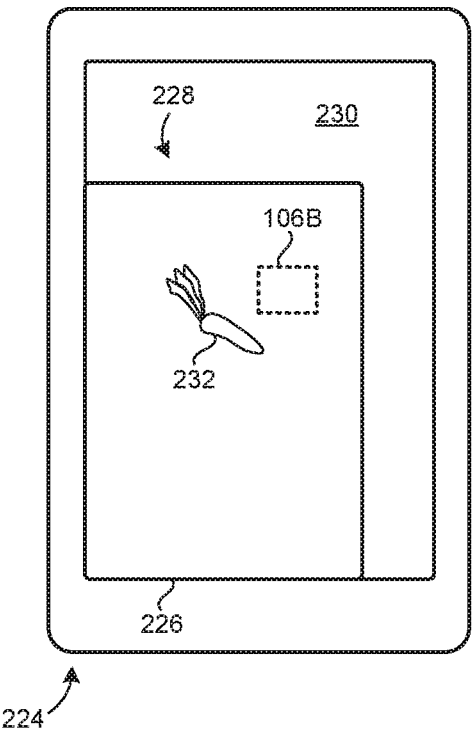

The RDF 216 can be shared with one or more devices. For example, FIG. 2D shows a device 224 that on its display screen 226 presents an AR environment 228 that currently includes an image 230 having a virtual object 232 applied to it. The device 224 can be similar or identical to the device 200. For example, the device 224 visits the location 118B (FIG. 1) and there recognizes the marker 106B, wherein the virtual object 232 is triggered by the recognition of that marker. The device 224 can initially localize its position in the space 102 (FIG. 1) by capturing any of the markers 106A-D. For example, the presentation of the virtual object 232 can be triggered by the localization of the device 224 at the location 118B, or the device 224 may have previously been localized at another one of the markers, and can thereafter recognize the marker 106B based on the RDF 216 that it has received. That is, two devices having the same RDF (e.g., the RDF 216) can localize their position at the same or different markers, and then have a common spatial understanding of the space where the markers are distributed. The RDF 216 can be shared with the device 224 by another participant device (e.g., the device 200) or by the device of an organizer (e.g., the device 110 in FIG. 1) to name just two examples.

Figure 3:
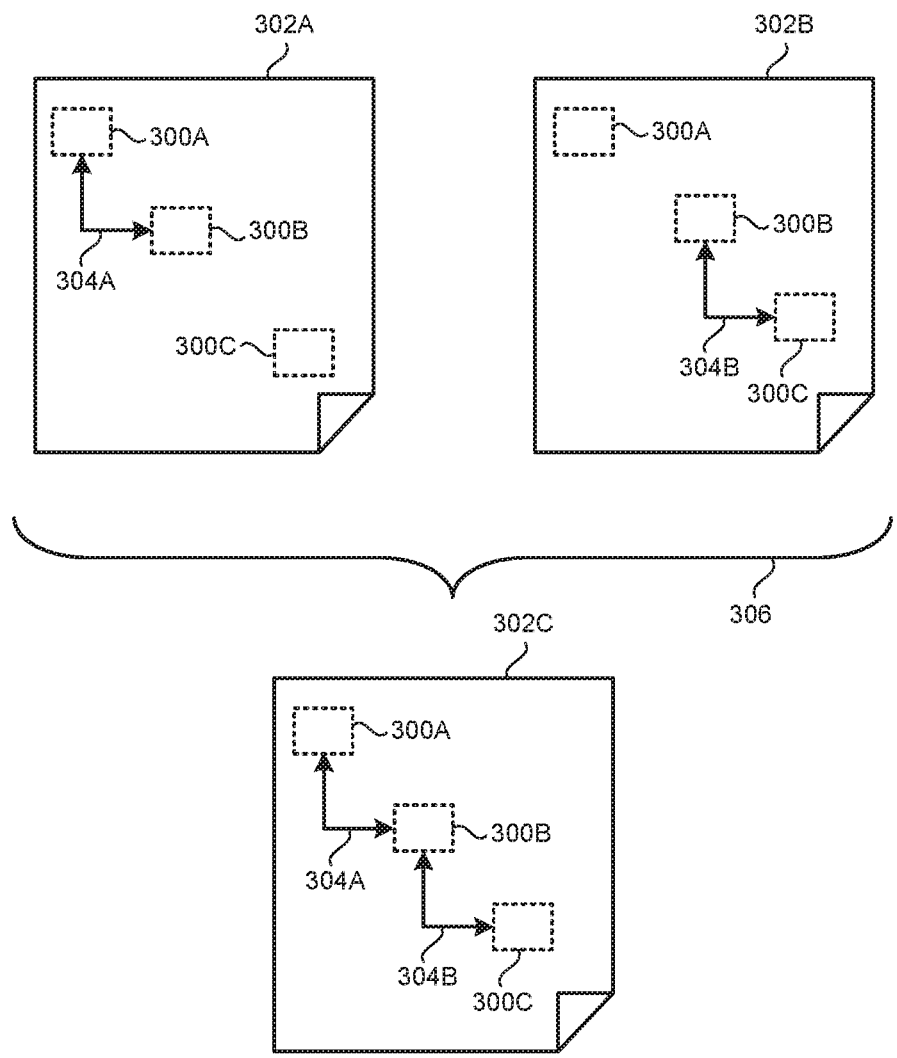
FIG. 3 shows an example of devices sharing relative description files and merging them with each other.

FIG. 3 shows an example of devices sharing RDFs and merging them with each other. Here, physical markers 300A-C have been distributed in a physical space. An RDF 302A is here used by (e.g., stored on) a first device, and an RDF 302B is used by (e.g., stored on) a second device. The first device in this example visits only the markers 300A and 300B, but not the marker 300C. For example, the first device localizes its position at the marker 300A and thereafter captures the marker 300B, or vice versa. The RDF 302A therefore defines a relative position 304A that connects the markers 300A-B. For example, the relative position 304A can comprise a displacement of the marker 300B relative to the marker 300A. In contrast, the RDF 302A does not define any relative position regarding the marker 300C which has not been captured by the first device. In fact, the marker 300C may not be present in the RDF 302A in such situations but is shown here for purposes of explanation.

The second device in this example, moreover, visits only the markers 300B and 300C, but not the marker 300A. For example, the second device localizes its position at the marker 300B and thereafter captures the marker 300C, or vice versa. The RDF 302B therefore defines a relative position 304B that connects the markers 300B-C. For example, the relative position 304B can comprise a displacement of the marker 300C relative to the marker 300B. In contrast, the RDF 302B does not define any relative position regarding the marker 300A which has not been captured by the second device. In fact, the marker 300A may not be present in the RDF 302B but is shown here for purposes of explanation. Either or both of the first and second devices can share its corresponding RDF 302A or 302B with another device, such as with the other one of the first and second devices.

A device that receives an RDF can at least in part merge the received RDF with one or more RDFs already known to the device. Here, an operation 306 schematically illustrates that the RDFs 302A-B are being merged with each other to form an RDF 302C. The RDF 302C reflects relative positions regarding all of the markers 300A-C. That is, the RDF 302C includes both the relative positions 304A and 304B. From the perspective of the first device, which initially had identified the relative locations only of the markers 300A-B, the RDF 302C corresponds to the increased knowledge of also knowing the relative position of the marker 300C. Similarly, from the perspective of the second device, which initially had identified the relative locations only of the markers 300B-C, the RDF 302C corresponds to the increased knowledge of also knowing the relative position of the marker 300A. That is, the first device was able to learn about the marker 300C by way of the RDF 302B shared from the second device which had captured that marker, because the second device had also captured the marker 300B which was already known to the first device.

Figure 4:
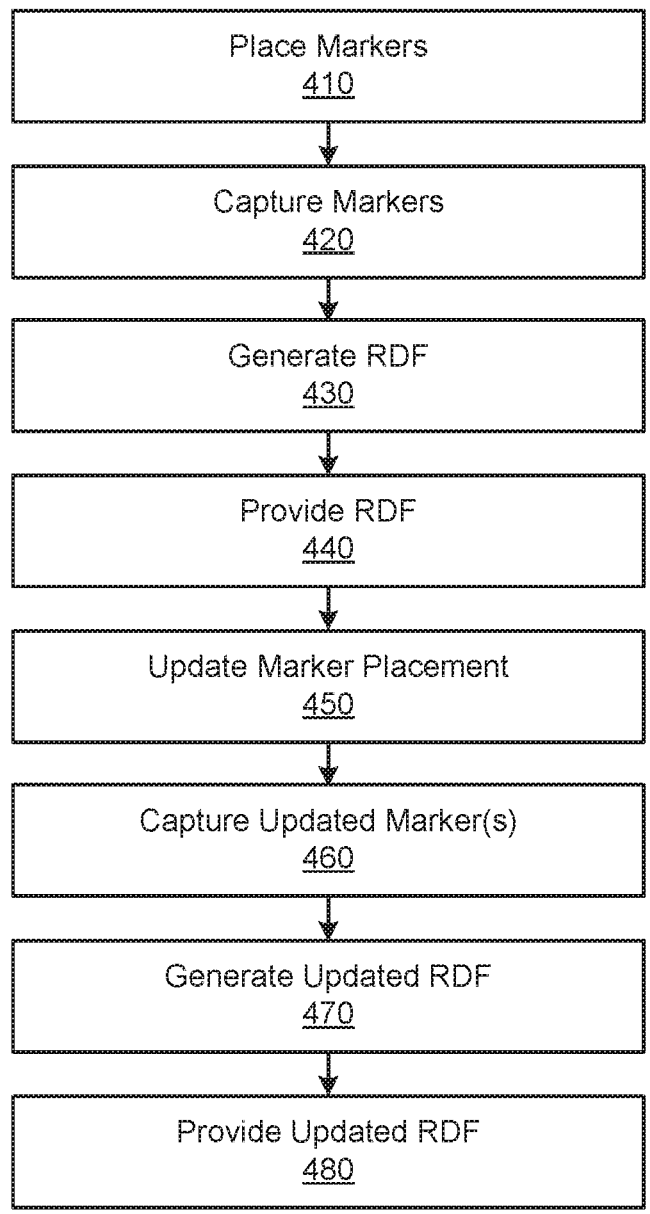
FIG. 4 shows an example of a method involving generation of a relative description file (RDF).
Figure 5:
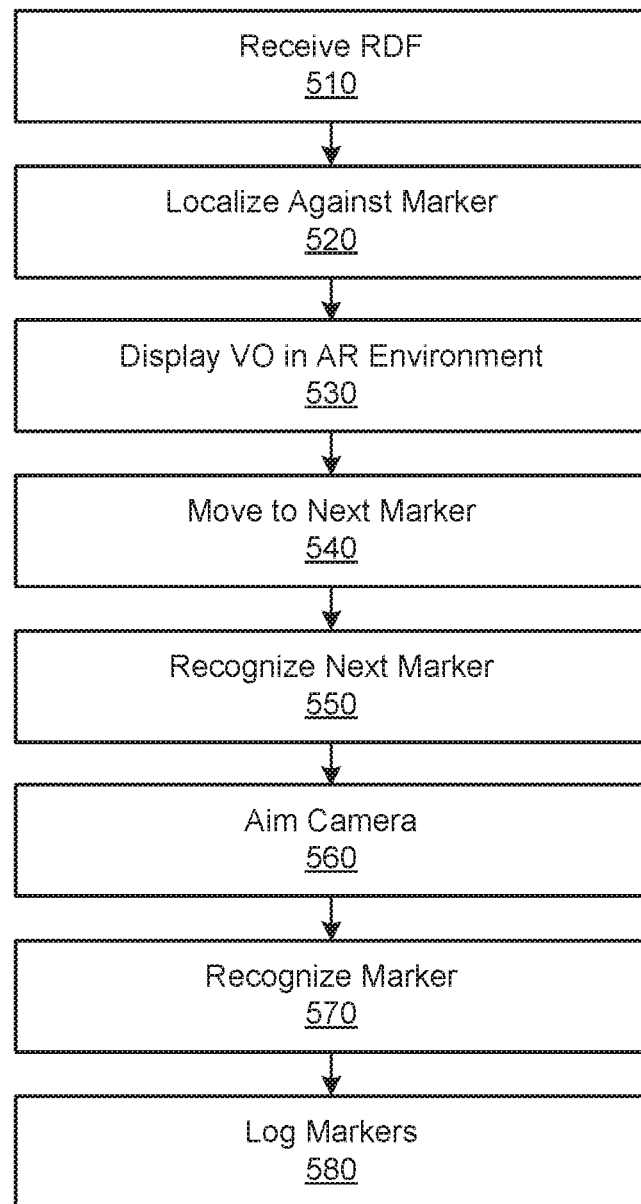
FIG. 5 shows an example of a method involving recognition of markers using an RDF.
Figure 6:
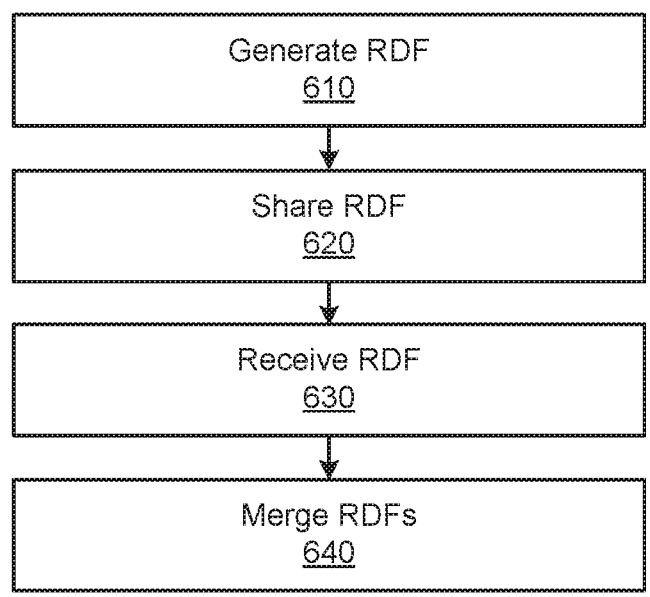
FIG. 6 shows an example of a method that involves at least one device sharing an RDF and merging the RDF with a received RDF.

FIGS. 4-6 show examples of methods. Any or all operations of a method can be performed using one or more processors executing instructions stored in a non-transitory storage medium, for example as described below. In some implementations, more or fewer operations than shown can be performed. In some implementations, two or more operations can be performed in a different order. Some components introduced elsewhere in this disclosure will be mentioned in the following description, solely for purposes of illustration.

FIG. 4 shows an example of a method 400 involving generation of a relative description file (RDF). At 410, markers can be placed. For example, an organizer can place the markers 106A-D in the space 102. At 420, markers can be captured. For example, the device 110 can capture the markers 106A-D at the respective locations 118A-D. At 430, an RDF can be generated. For example, the RDF 122 can be generated for the markers 106A-D. At 440, the RDF can be provided to one or more devices. For example, the device 110 can share the RDF 122 with the device 200 and with the device 224. The device 200 and/or 224 can then use the provided RDF to localize its position and recognize one or more markers.

At 450, the marker placement can be updated. For example, the organizer can change the position of one or more of the markers 106A-D, or can add one or more new physical markers. At 460, the updated marker(s) can be captured. For example, the organizer can capture the updated marker(s) in the space 102 using the device 110. At 470, an updated RDF can be generated. For example, the device 110 can update the RDF 122. At 480, the updated RDF can be provided to one or more devices. For example, the device 110 can share the updated RDF 122 with the device 200 and with the device 224. The device 200 and/or 224 can then use the provided updated RDF to localize its position and recognize one or more markers.

FIG. 5 shows an example of a method 500 involving recognition of markers using an RDF. At 510, an RDF can be received. For example, the device 200 can receive the RDF 216. At 520, localization against a physical marker can be performed. For example, the device 200 can localize its position by capturing any of the markers 106A-D. At 530, a virtual object (VO) can be displayed in an AR environment. For example, the device 200 can present the virtual object 212 in the AR environment 204. At 540, the device can move to the next marker. For example, the device 200 can be moved from the location 118A to the location 118C. At 550, the device can recognize the next marker. For example, the device can recognize the marker 106C at the location 118C. The device 200 can recognize the marker 106C by way of the sensor 218 on the device 200 capturing an image of the marker 106C, or by way of an extrapolation using the RDF 216 that indicates the marker 106C to the device 200. At 560, the user can aim the camera of the device in a direction. For example, while at the location 118C the device 200 can be aimed toward the location 118A. At 570, a marker can be recognized. For example, the device 200 while at the location 118C can recognize the marker 106A at the location 118A, either because a line-of-sight to the marker 106A is available, or by way of the RDF 216. At 580, one or more markers can be registered in a log. For example, the device 200 can log the markers 106A and 106C.

FIG. 6 shows an example of a method 600 that involves at least one device sharing an RDF and merging the RDF with a received RDF. At 610, an RDF can be generated. For example, the second device mentioned with regard to FIG. 3 can generate the RDF 302B. At 620, the RDF can be shared with at least one device. For example, the second device can share the RDF 302B with the first device mentioned with regard to FIG. 3. At 630, an RDF can be received. For example, the second device can receive the RDF 302A from the first device. At 640, two or more RDFs can be merged at least in part. For example, the second device can merge the RDFs 302A-B to form the RDF 302C. That is, the second device can learn about the marker 300A, by way of the RDF 302A shared from the first device which had captured that marker, because the first device had also captured the marker 300B which was already known to the second device.

Figure 7:
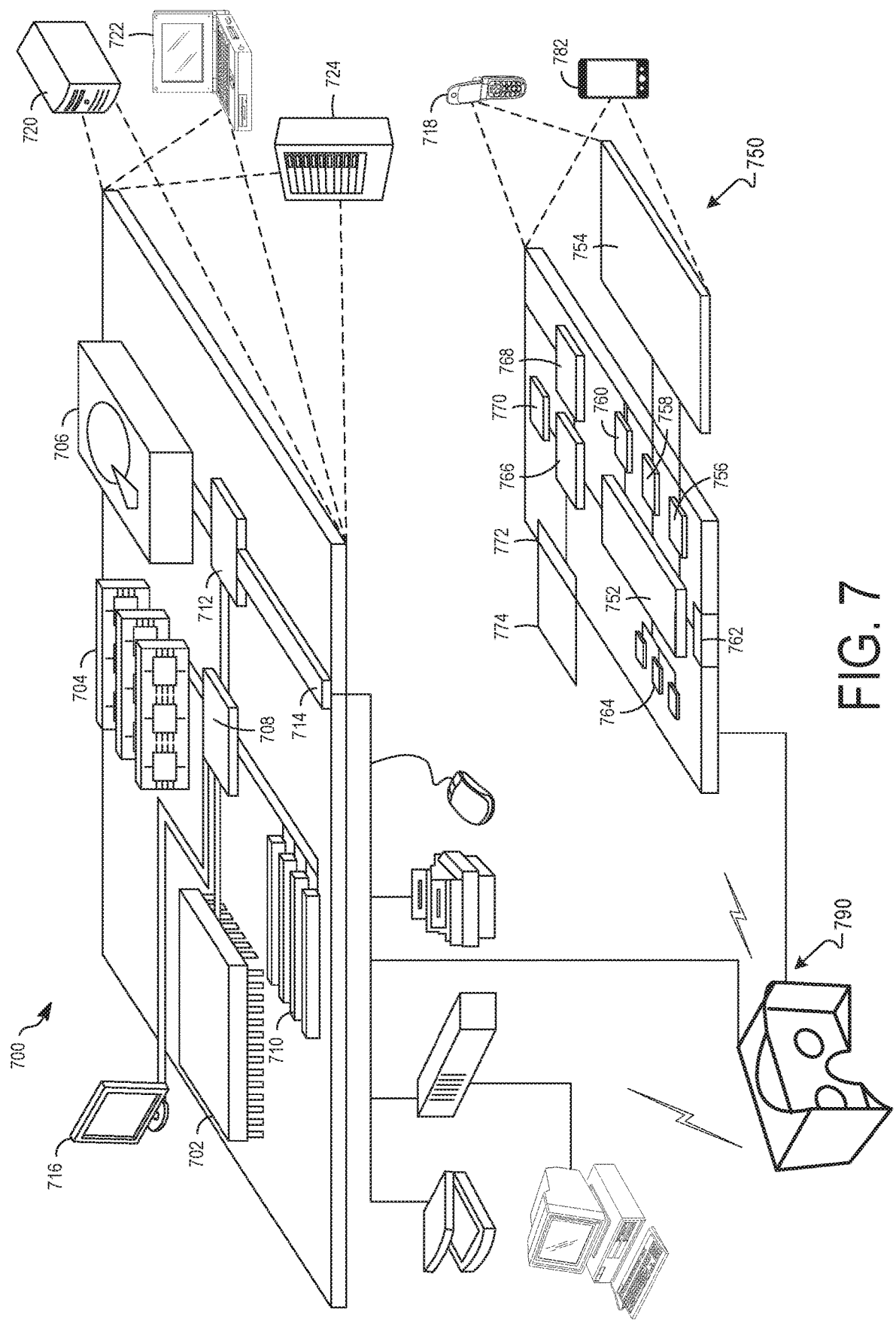
FIG. 7 shows an example of a computer device and a mobile computer device consistent with disclosed embodiments.

FIG. 7 shows an example of a computer device and a mobile computer device that can be used to implement the techniques described here. FIG. 7 shows an example of a generic computer device 700 and a generic mobile computer device 750, which may be used with the techniques described here. Computing device 700 is intended to represent various forms of digital computers, such as laptops, desktops, tablets, workstations, personal digital assistants, televisions, servers, blade servers, mainframes, and other appropriate computing devices. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. The processor 702 can be a semiconductor-based processor. The memory 704 can be a semiconductor-based memory. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

A user can interact with a computing device using a tracked controller 784. In some implementations, the controller 784 can track the movement of a user's body, such as of the hand, foot, head and/or torso, and generate input corresponding to the tracked motion. The input can correspond to the movement in one or more dimensions of motion, such as in three dimensions. For example, the tracked controller can be a physical controller for a VR application, the physical controller associated with one or more virtual controllers in the VR application. As another example, the controller 784 can include a data glove.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 7 can include sensors that interface with a virtual reality (VR headset 785). For example, one or more sensors included on a computing device 750 or other computing device depicted in FIG. 7, can provide input to VR headset 785 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 750 can use the sensors to determine an absolute position and/or a detected rotation of the computing device in the VR space that can then be used as input to the VR space. For example, the computing device 750 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 750 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 750 when the computing device is incorporated into the VR space can cause a particular action to occur in the VR space.

In some implementations, a touchscreen of the computing device 750 can be rendered as a touchpad in VR space. A user can interact with the touchscreen of the computing device 750. The interactions are rendered, in VR headset 785 for example, as movements on the rendered touchpad in the VR space. The rendered movements can control objects in the VR space.

In some implementations, one or more output devices included on the computing device 750 can provide output and/or feedback to a user of the VR headset 785 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 750 may appear as another object in a computer-generated, 3D environment. Interactions by the user with the computing device 750 (e.g., rotating, shaking, touching a touchscreen, swiping a finger across a touch screen) can be interpreted as interactions with the object in the VR space. In the example of the laser pointer in a VR space, the computing device 750 appears as a virtual laser pointer in the computer-generated, 3D environment. As the user manipulates the computing device 750, the user in the VR space sees movement of the laser pointer. The user receives feedback from interactions with the computing device 750 in the VR space on the computing device 750 or on the VR headset 785.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
presenting an augmented reality environment on a display of a first device, the augmented reality environment including at least an image captured using an image sensor of the first device and at least a first virtual object applied to the image;
receiving, in the first device, a relative description file for physical markers that are positioned at locations, the relative description file defining relative positions for each of the physical markers with regard to at least another one of the physical markers;
initially localizing a position of the first device among the physical markers by aiming the image sensor in a first direction toward a first physical marker and visually capturing the first physical marker of the physical markers using the image sensor of the first device;
recognizing a second physical marker of the physical markers and a location of the second physical marker without a line of sight between the image sensor and the second physical marker, the second physical marker recognized using the relative description file, wherein a user moves the first device to the location of the second physical marker, and wherein at the location of the second physical marker the first physical marker is no longer visible in the augmented reality environment and the user aims the image sensor in a second direction toward the location of the first physical marker without a line of sight between the image sensor and the first physical marker; and
updating the augmented reality environment with the first virtual object at a predefined location relative to the first physical marker.

2. The method of claim 1, wherein at least the first physical marker comprises a code.

3. The method of claim 1, wherein at least the first physical marker comprises a natural marker.

4. The method of claim 1, wherein the first virtual object is positioned in the image at a predefined location relative to the first physical marker.

5. The method of claim 1, wherein, after the position of the first device is initially localized, the user aims the image sensor in a third direction, and wherein recognizing the second physical marker comprises determining, using the relative description file, that the location of the second physical marker is located in the third direction.

6. The method of claim 5, further comprising updating the augmented reality environment with a second virtual object in a predefined position relative to the second physical marker.

7. The method of claim 5, wherein before the second physical marker is recognized, the second physical marker is removed from the location of the second physical marker, and wherein the second physical marker and the location of the second physical marker are recognized using the relative description file.

8. The method of claim 1, wherein initially localizing the position of the first device comprises centering a coordinate system of the first device based on the location of the first physical marker, and wherein recognizing the second physical marker does not comprise re-centering the coordinate system.

9. The method of claim 8, wherein centering the coordinate system of the first device comprises recalibrating a center of the coordinate system to correct a tracking error.

10. The method of claim 1, wherein initially localizing the position of the first device comprises centering a coordinate system of the first device based on the location of the first physical marker, wherein recognizing the second physical marker comprises re-centering the coordinate system, and wherein any virtual objects continue to be presented in a same space via camera passthrough because relative coordinates are proportionally the same.

11. The method of claim 1, further comprising providing the relative description file to a second device, wherein the second device is configured to initially localize a position of the second device among the physical markers by visually capturing any one of the physical markers using an image sensor of the second device, and to use the relative description file to recognize locations of all remaining ones of the physical markers without a line of sight.

12. The method of claim 1, wherein the relative description file is a first relative description file, the method further comprising receiving a second relative description file from a second device, and at least partially merging the first and second relative description files.

13. The method of claim 1, wherein the relative description file defines the relative position of the second physical marker with regard to the first physical marker, the relative position comprising a displacement of the second physical marker relative to the first physical marker.

14. The method of claim 1, wherein the first device recognizes at least some of the physical markers, the method further comprising generating a log on the first device reflecting the at least some of the physical markers that the first device has recognized.

15. The method of claim 1, wherein the relative description file defines the relative position of each of the physical markers with regard to all other ones of the physical markers.

16. A non-transitory storage medium having stored thereon instructions that when executed are configured to cause a processor to perform operations, the operations comprising:
    presenting an augmented reality environment on a display of a first device, the augmented reality environment including at least an image captured using an image sensor of the first device and at least a first virtual object applied to the image;
    receiving, in the first device, a relative description file for physical markers that are positioned at locations, the relative description file defining relative positions for each of the physical markers with regard to at least another one of the physical markers;
    initially localizing a position of the first device among the physical markers by aiming the image sensor in a first direction toward a first physical marker and visually capturing the first physical marker of the physical markers using the image sensor of the first device;
    recognizing a second physical marker of the physical markers and a location of the second physical marker without a line of sight between the image sensor and the second physical marker, the second physical marker recognized using the relative description file, wherein a user moves the first device to the location of the second physical marker, and wherein at the location of the second physical marker the first physical marker is no longer visible in the augmented reality environment and the user aims the image sensor in a second direction toward the location of the first physical marker without a line of sight between the image sensor and the first physical marker; and
    updating the augmented reality environment with the first virtual object at a predefined location relative to the first physical marker.

17. A device comprising:
    at least one processor; and
    a non-transitory storage medium having stored thereon:
        a first relative description file for physical markers that are positioned at locations, the first relative description file defining relative positions for each of the physical markers with regard to at least another one of the physical markers; and
        instructions that when executed are configured to cause the processor to perform operations, the operations comprising:
            presenting an augmented reality environment on a display of a device, the augmented reality environment including at least an image captured using an image sensor of the device and at least a first virtual object applied to the image;
            initially localizing a position of the device among the physical markers by aiming the image sensor in a first direction toward a first physical marker and visually capturing the first physical marker of the physical markers using the image sensor of the device;
            recognizing a second physical marker of the physical markers and a location of the second physical marker without a line of sight between the image sensor and the second physical marker, the second physical marker recognized using the first relative description file, wherein a user moves the device to the location of the second physical marker, and wherein at the location of the second physical marker the first physical marker is no longer visible in the augmented reality environment and the user aims the image sensor in a second direction toward the location of the first physical marker without a line of sight between the image sensor and the first physical marker; and
            updating the augmented reality environment with the first virtual object at a predefined location relative to the first physical marker.

18. The device of claim 17, wherein the first relative description file defines a first relative position that connects the first and second physical markers, and wherein the first relative description file does not define a second relative position that connects the second physical marker and a third physical marker.

19. The device of claim 18, wherein the operations further comprise: receiving a second relative description file that defines the second relative position, and at least in part merging the first and second relative description files to a third relative description file that reflects the first and second relative positions.

* * * * *